(12) United States Patent
Chen et al.

(10) Patent No.: US 9,946,028 B2
(45) Date of Patent: Apr. 17, 2018

(54) WAFER ASSEMBLY INCLUDING A GUIDE PIN WAFER

(71) Applicant: Finisar Corporation, Sunnyvale, CA (US)

(72) Inventors: Jiashu Chen, Milpitas, CA (US); Steve Macica, Truckee, CA (US); Idan Mizrahi, Fremont, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 15/382,373

(22) Filed: Dec. 16, 2016

(65) Prior Publication Data

US 2017/0176686 A1  Jun. 22, 2017

Related U.S. Application Data

(60) Provisional application No. 62/269,734, filed on Dec. 18, 2015.

(51) Int. Cl.
| | |
|---|---|
| *G02B 6/36* | (2006.01) |
| *G02B 6/30* | (2006.01) |
| *G02B 6/32* | (2006.01) |
| *G02B 6/42* | (2006.01) |
| *G02B 6/43* | (2006.01) |

(52) U.S. Cl.
CPC ............ *G02B 6/30* (2013.01); *G02B 6/322* (2013.01); *G02B 6/4249* (2013.01); *G02B 6/4292* (2013.01); *G02B 6/43* (2013.01)

(58) Field of Classification Search
CPC ...... G02B 6/4249; G02B 6/4292; G02B 6/43; G02B 6/4246; G02B 6/4214; G02B 6/428; G02B 6/30; H01L 2924/01013; H01L 2924/01029; H01L 2924/01032; H01L 2924/01049; H01L 2924/10158; H01L 2924/10329; H01L 2924/10336; H01L 2924/14; H01L 2924/19043; H01L 2924/01005; H01L 2924/01023; H01L 2924/01033; H01L 2924/1461; H01L 2924/00; H01L 2924/12043; H01L 2224/81136; H01L 2224/81801
USPC ............... 385/14, 33, 49–50, 53–94; 438/28, 438/31–32, 65, 66; 257/434, E31.11, 257/E33.058; 398/135
See application file for complete search history.

(56) References Cited

U.S. PATENT DOCUMENTS

| | | | |
|---|---|---|---|
| 2014/0341516 A1* | 11/2014 | Mathai ................. | G02B 6/4259 385/93 |
| 2015/0037044 A1* | 2/2015 | Peterson .............. | G02B 6/4292 398/135 |
| 2016/0013086 A1* | 1/2016 | Yang, II ............ | H01L 21/67303 414/222.03 |

* cited by examiner

*Primary Examiner* — Akm Enayet Ullah
*Assistant Examiner* — Michael Mooney
(74) *Attorney, Agent, or Firm* — Maschoff Brennan

(57) ABSTRACT

A guide pin wafer may include a base wafer that includes multiple dies. Each die may include a corresponding lens cutout. The guide pin wafer may also include multiple guide pins mounted on the base wafer. Each die of the base wafer may be mounted with two or more corresponding guide pins that may be configured to engage a parallel fiber connector to the corresponding die.

21 Claims, 3 Drawing Sheets

WAFER ASSEMBLY INCLUDING A GUIDE PIN WAFER

CROSS-REFERENCE TO RELATED APPLICATION

This application claims the benefit of and priority to U.S. Provisional App. No. 62/269,734, filed Dec. 18, 2015, which is incorporated herein by reference.

FIELD

Some embodiments described herein generally relate to a wafer assembly that includes a guide pin wafer.

BACKGROUND

Unless otherwise indicated herein, the materials described herein are not prior art to the claims in the present application and are not admitted to be prior art by inclusion in this section.

A parallel optical transceiver may use a mechanically transferable (MT) ferrule or a mechanically transferable push-on (MTP) connector to couple light from the optical transceiver into an optical fiber bundle. Guide pins may usually be included in a supporting structure of a lens frame to maintain rigidity and mechanical accuracy of the guide pins.

The subject matter claimed herein is not limited to embodiments that solve any disavantages or that operate only in environments such as those described above. Rather, this background is only provided to illustrate one exemplary technology area where some embodiments described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example embodiments described herein generally relate to a wafer assembly.

In an example embodiment, a guide pin wafer may include a base wafer that includes multiple dies with each die including a corresponding lens cutout. The guide pin wafer may also include multiple guide pins mounted on the base wafer. Each die of the base wafer may be mounted with two or more corresponding guide pins that may be configured to engage a parallel fiber connector to the corresponding die.

In another example embodiment, a wafer assembly may include a guide pin wafer. The guide pin wafer may include a base wafer that includes multiple first dies. Each first die may include a corresponding lens cutout. The guide pin wafer may also include multiple guide pins mounted on a first surface of the base wafer. Each first die of the base wafer may be mounted with two or more corresponding guide pins from the multiple guide pins. The wafer assembly may also include a circuit wafer that includes multiple second dies. Each second die may include a corresponding circuit unit. The wafer assembly may also include a lens wafer that includes multiple third dies. Each third die may include a corresponding lens unit. The lens wafer may be disposed between the guide pin wafer and the circuit wafer. The guide pin wafer, the lens wafer, and the circuit wafer may be aligned with each other on a wafer scale level.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Figure 1A:
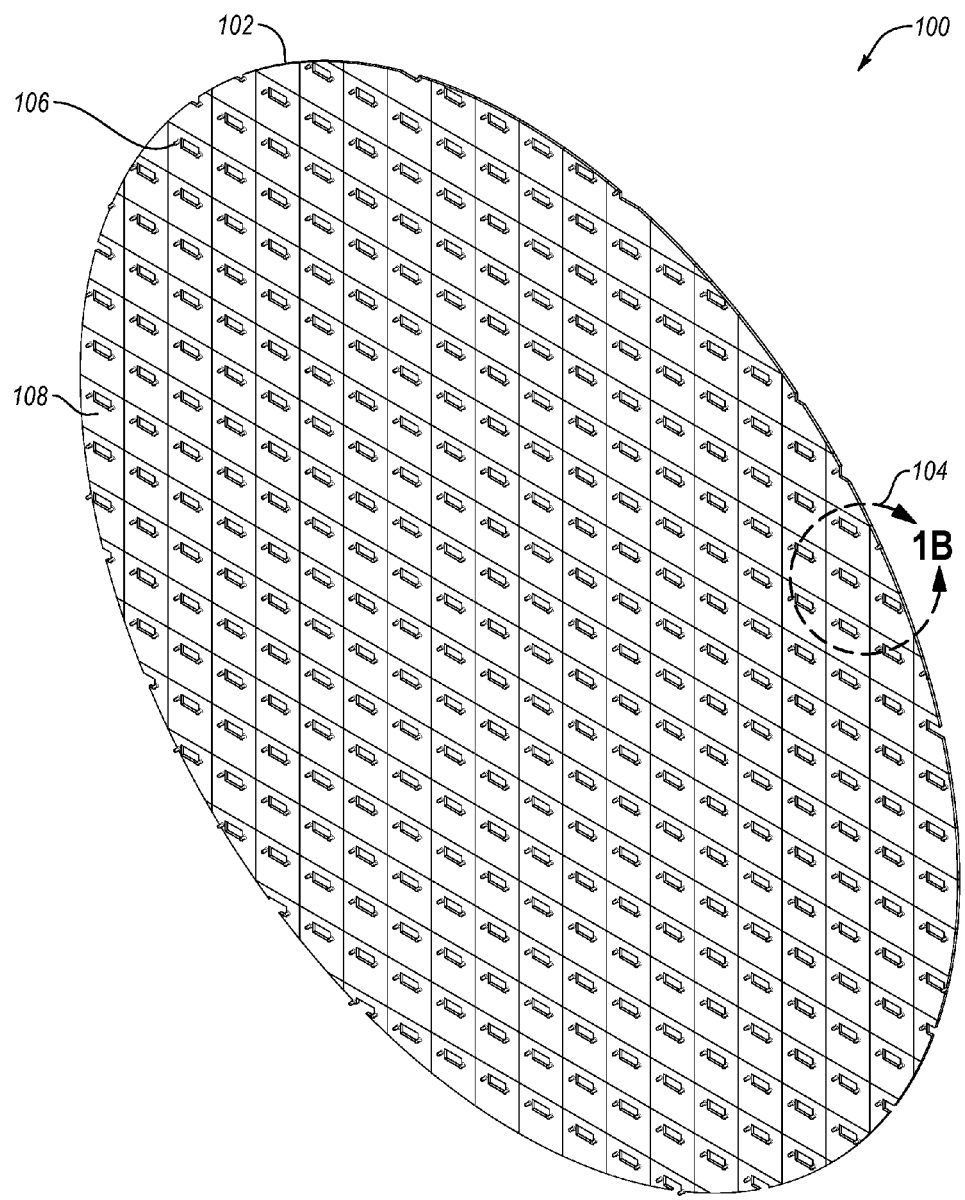
FIG. 1A is a perspective view of an example guide pin wafer.

Embodiments described herein generally relate to a wafer assembly.

In a wafer scale level assembly, it may be difficult to implant guide pins into a substrate wafer if the substrate wafer is made of fragile wafer materials. Technologies described herein may implant guide pins in a wafer scale level. For example, a guide pin wafer may include guide pins mounted on a base wafer made of a structural material, such as a metallic material (e.g., stainless steel) or plastic material or other material that may satisfy a strength requirement. The guide pin wafer may be segmented into multiple dies. Each die may include a lens cutout configured to accommodate a corresponding lens unit (e.g., a lens or a lens array). Each die may also include two or more guide pins configured to engage and/or align a parallel fiber connector (e.g., an MT ferrule, an MTP connector, etc.) to the corresponding die, so that the corresponding lens unit may be optically coupled to an optical fiber (or an optical fiber bundle) through the parallel fiber connector.

The guide pin wafer may be mounted on a lens wafer and/or a circuit wafer (e.g., a transceiver substrate wafer) to form a wafer assembly. Individual optical assemblies (e.g., individual optical transceivers) with the guide pin structure described herein may be obtained by dicing the wafer assembly through a wafer dicing process. An example advantage of the guide pin structure described herein may include providing electromagnetic interference (EMI) shielding to a corresponding transceiver on a corresponding die. Another example advantage may include producing a smaller coefficient of thermal expansion (CTE), when compared with a conventional plastic-lens guide-pin combination. Other example advantages are possible.

Conventionally, a circuit wafer may be diced into individual dies and then optical circuitry may be placed on each individual die respectively. Afterwards, guide pins may be attached to each die on a per die basis at a component level or a package level when each die may be packaged into a single device. For example, if there are 250 dies separated from a circuit wafer, 250 separate alignment processes may need to be performed on the 250 dies respectively so that each die may be coupled to and aligned with an MT ferrule or an MTP connector.

However, different from the above conventional alignment manner performed on a per die basis, some embodiments described herein may allow the circuit wafer to form a wafer assembly together with a lens wafer and a guide pin wafer. The guide pin wafer may be implanted with guide pins that may be used to couple to the MT ferrules or the MTP connectors. The circuit wafer, the lens wafer, and the guide pin wafer may be aligned and assembled at a wafer scale level to form the wafer assembly. The wafer assembly may then be diced into individual dies with guide pins that are ready to couple to the MT ferrules or the MTP connectors. The wafer scale level alignment described herein is cheaper and more efficient than the conventional alignment manner performed on a per die basis.

The technologies described herein may be applied in, for example, short-wave and/or long-wave parallel or multi-fiber transceivers with vertical-cavity surface-emitting lasers (VCSELs) or other types of lasers.

Reference will now be made to the drawings to describe various aspects of some example embodiments of the invention. The drawings are diagrammatic and schematic representations of such example embodiments, and are not limiting of the present invention, nor are they necessarily drawn to scale.

FIG. 1A is a perspective view of an example guide pin wafer 100, arranged in accordance with at least some embodiments described herein. The guide pin wafer 100 may include a base wafer 102, multiple guide pins 106 mounted on the base wafer 102, and any other suitable elements. The base wafer 102 may include a wafer made of structural materials that may satisfy a strength requirement. For example, the base wafer 102 may include a stainless steel wafer or a wafer made of other suitable structural material. A satisfaction of the strength requirement of the base wafer 102 may allow the guide pins 106 to be implanted into the base wafer 102 without breaking the base wafer 102 or compromising performance of the base wafer 102.

In some embodiments, the base wafer 102 may be segmented into multiple dies 108. The dies 108 may include fully-patterned dies that may fully lie within the base wafer 102 and/or partially-patterned dies that do not fully lie within the base wafer 102. In some embodiments, each of the multiple dies 108 (e.g., each of the fully-patterned dies) may be mounted with two or more corresponding guide pins 106 from the multiple guide pins 106. The two or more corresponding guide pins 106 mounted on the corresponding die 108 may be configured to engage the corresponding die 108 to and/or align the corresponding die 108 with an MT ferrule, a MTP connector, a multi-fiber push-on (MPO) connector, or another suitable type of parallel fiber connector. A detailed view of a portion 104 of the guide pin wafer 100 is illustrated in FIG. 1B.

Figure 1B:
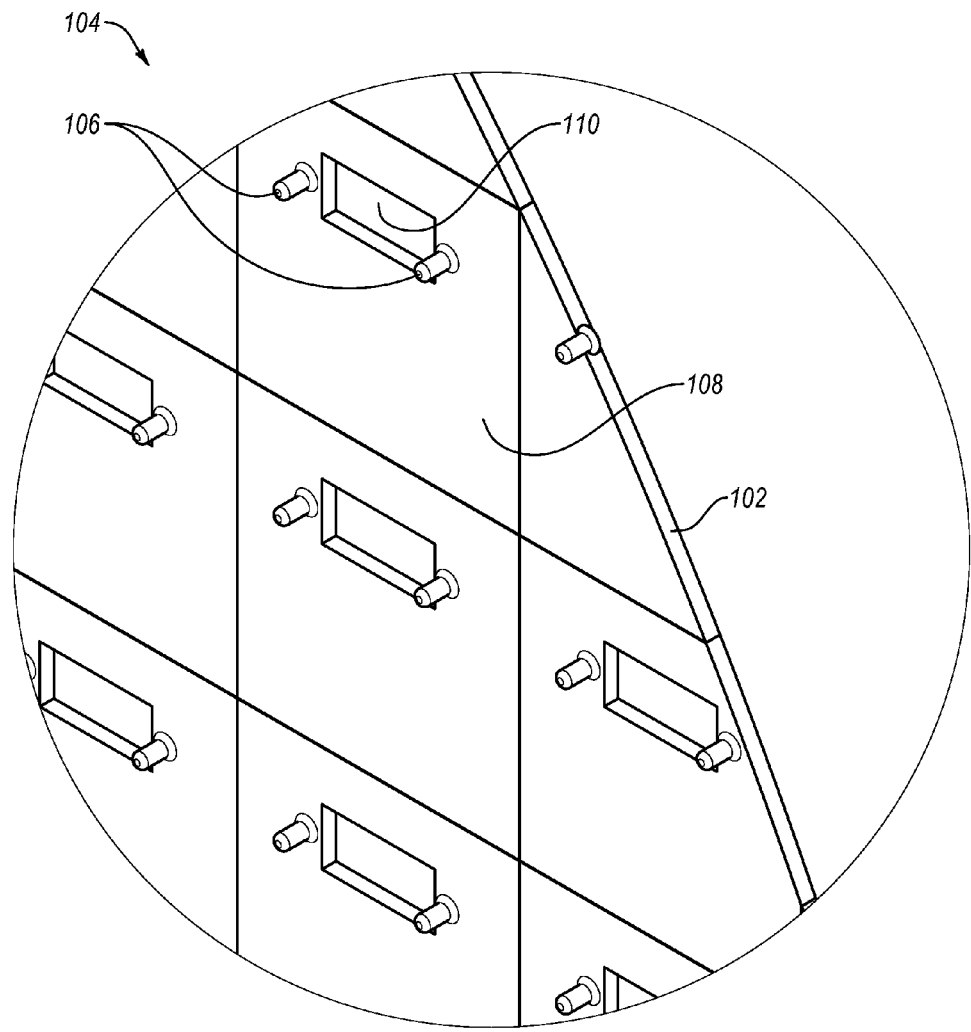
FIG. 1B is a perspective view of a portion of the example guide pin wafer of FIG. 1A.

FIG. 1B is a perspective view of the portion 104 of the example guide pin wafer 100 of FIG. 1A, arranged in accordance with at least some embodiments described herein. The portion 104 of the guide pin wafer 100 may include a portion of the base wafer 102, multiple dies 108 that may segment the portion of the base wafer 102, two or more corresponding guide pins 106 mounted on each die 108, and a corresponding lens cutout 110 on each die 108. As illustrated in FIG. 1B, each die 108 (or each fully-patterned die) may have a square shape, a rectangular shape, or any other suitable geometric shape.

The corresponding lens cutout 110 of each die 108 may be configured to accommodate a lens unit (e.g., a lens or a lens array) from a lens wafer. For example, a lens unit may be placed in the lens cutout 110 or may be placed immediately in front of or behind the lens cutout 110 or may otherwise be aligned with the lens cutout 110. The lens cutout 110 of each die 108 may be made through wafer litho/etching processes for alignment accuracy.

In some embodiments, each die 108 may include two or more lens cutouts 110 to accommodate two or more lens units per die 108.

In some embodiments, the two or more corresponding guide pins 106 of each die 108 may be mounted around the corresponding lens cutout 110 of the corresponding die 108. The two or more corresponding guide pins 106 may be configured to be engaged with a parallel fiber connector to facilitate alignment and an optical coupling between: (1) a lens unit accommodated by the corresponding lens cutout 110; and (2) an optical fiber (or an optical fiber bundle). When the lens unit is placed in or otherwise aligned with the lens cutout 110, the lens unit may be automatically aligned with and optically coupled to the optical fiber (or the optical fiber bundle) through the parallel fiber connector. For example, the two or more corresponding guide pins 106 may help to align the lens unit with the parallel fiber connector, allowing light that passes through the lens unit to propagate to the optical fiber (or the optical fiber bundle) through the parallel fiber connector, or vice versa.

Figure 2:
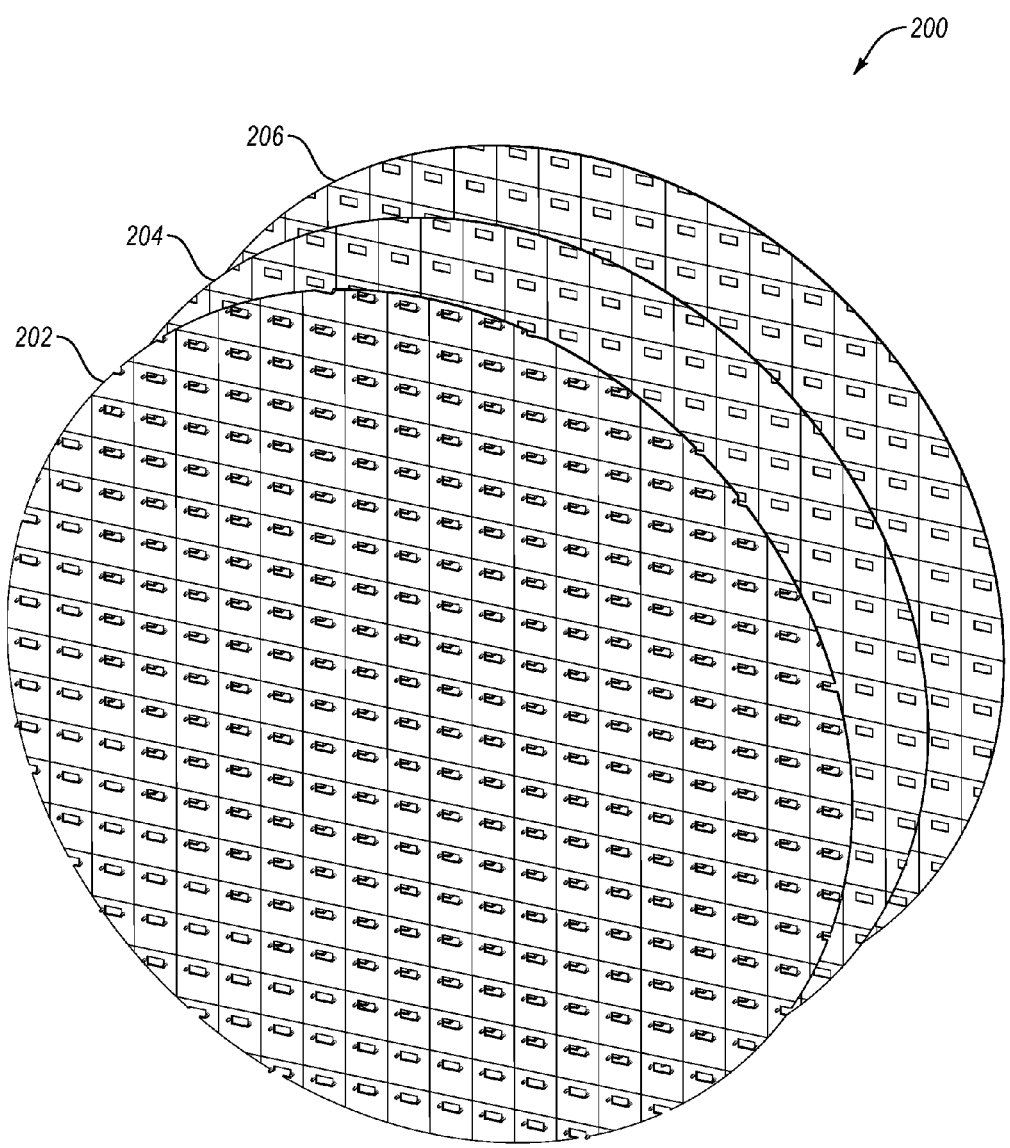
FIG. 2 is a perspective view of an example wafer assembly that includes an example guide pin wafer, an example lens wafer, and an example circuit wafer.

FIG. 2 is a perspective view 200 of an example wafer assembly 200 that includes an example guide pin wafer 202, an example lens wafer 204, and an example circuit wafer 206, arranged in accordance with at least some embodiments described herein. The guide pin wafer 202 may be identical or similar to the guide pin wafer 100 of FIG. 1A. In some embodiments, the guide pin wafer 202 may include a base wafer identical or similar to the base wafer 102 of FIG. 1A. The base wafer of the guide pin wafer 202 may include a first surface mounted with guide pins (e.g., identical or similar to guide pins 106 of FIG. 1A) and a second surface opposite to the first surface. The lens wafer 204 may be attached or coupled to the second surface of the base wafer of the guide pin wafer 202.

The lens wafer 204 may include multiple dies. Each die of the lens wafer 204 may include cutouts configured for placing lens units in the lens wafer 204. Alternatively or additionally, each die of the lens wafer 204 may be mounted with a corresponding lens unit. A lens unit may include a single lens or a lens array with multiple lenses. A lens may be made of ultem material, glass, or any other suitable material.

The circuit wafer 206 may include multiple dies. Each die of the circuit wafer 206 may be mounted with a corresponding circuit unit. A circuit unit in the circuit wafer 206 may include circuitry associated with a transmitter, a receiver, or a transceiver. In some embodiments, the circuit wafer 206 may include a transceiver substrate wafer assembly. The circuit wafer 206 may act as a carrier substrate for the circuit units.

In some embodiments, the guide pin wafer 202, the lens wafer 204, and the circuit wafer 206 may be aligned with each other and stacked together to form the wafer assembly 200 through a wafer scale level assembly process. The lens wafer 204 may be disposed between the guide pin wafer 202 and the circuit wafer 206.

The wafer assembly 200 may include multiple optical die assemblies. Each optical die assembly may include: a first die from the guide pin wafer 202 that may include a lens cutout and two or more guide pins; a second die from the lens wafer 204 that may include a lens unit; and a third die from the circuit wafer 206 that may include a circuit unit. The first die, the second die, and the third die may be aligned with each other on a wafer scale level. After alignment of the first, second, and third dies on a wafer level, each circuit unit of the third die may be aligned to a corresponding lens unit of the second die. Similarly, each lens unit of the second die may be accommodated in a corresponding lens cutout of a corresponding first die to optically couple to a corresponding optical fiber (or an optical fiber bundle) through a parallel fiber connector, where the parallel fiber connector may attach to or mount on the first die via the two or more guide pins on the first die.

The wafer assembly 200 may be sawed to obtain individual optical die assemblies through a wafer dicing process. Each optical die assembly may include an optical assembly (e.g., a transmitter, a receiver, or a transceiver) configured to perform a transmission function and/or a receiving function.

In some embodiments, the circuit wafer 206 may be made of glass or another suitable type of transparent materials, allowing a light beam emitted from a corresponding laser on a corresponding die to pass through the circuit wafer 206 to a corresponding lens unit in the lens wafer 204. The corresponding lens unit in the lens wafer 204 may focus the light beam to an optical fiber (or an optical fiber bundle) through a parallel fiber connector engaged to guide pins in the guide pin wafer 202.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A guide pin wafer comprising:
   a substantially planar base wafer that includes multiple dies with each die including a corresponding lens cutout; and
   multiple guide pins implanted in the base wafer, the guide pins having an end extending into the base wafer, each die of the base wafer being implanted with two or more corresponding guide pins that are configured to engage a parallel fiber connector to the corresponding die.

2. The guide pin wafer of claim 1, wherein the base wafer is made of structural material that satisfies a strength requirement.

3. The guide pin wafer of claim 2, wherein the structural material includes stainless steel.

4. The guide pin wafer of claim 1, wherein the two or more corresponding guide pins for each die are mounted around the corresponding lens cutout of the corresponding die.

5. The guide pin wafer of claim 1, wherein the corresponding lens cutout of each die is configured to accommodate a lens unit from a lens wafer.

6. The guide pin wafer of claim 1, wherein the parallel fiber connector includes one of a mechanically transferable (MT) ferrule, a mechanically transferable push-on (MTP) connector, or a multi-fiber push-on (MPO) connector.

7. A wafer assembly comprising:
   a guide pin wafer that includes:
      a base wafer that includes multiple first dies, each first die including a corresponding lens cutout; and
      multiple guide pins mounted on a first surface of the base wafer, each first die of the base wafer being mounted with two or more corresponding guide pins from the multiple guide pins;
   a circuit wafer that includes multiple second dies, each second die including a corresponding circuit unit; and
   a lens wafer that includes multiple third dies, each third die including a corresponding lens unit, the lens wafer being disposed between the guide pin wafer and the circuit wafer,
   wherein the guide pin wafer, the lens wafer, and the circuit wafer are aligned with each other on a wafer scale level.

8. The wafer assembly of claim 7, wherein a corresponding first die from the guide pin wafer, a corresponding second die from the circuit wafer, and a corresponding third die from the lens wafer are aligned with each other on the wafer scale level.

9. The wafer assembly of claim 7, wherein the lens wafer is coupled to a second surface of the guide pin wafer that is opposite to the first surface of the guide pin wafer.

10. The wafer assembly of claim 7, wherein the multiple first dies, the multiple second dies, and the multiple third dies include multiple fully-patterned dies, respectively.

11. The wafer assembly of claim 7, wherein the base wafer is made of structural material that satisfies a strength requirement.

12. The wafer assembly of claim 11, wherein the structural material includes stainless steel.

13. The wafer assembly of claim 7, wherein the corresponding lens cutout of each first die from the guide pin wafer is configured to accommodate a corresponding lens unit from the lens wafer.

14. The wafer assembly of claim 7, wherein the two or more corresponding guide pins on each first die are configured to engage the corresponding first die to a mechanically transferable (MT) ferrule.

15. The wafer assembly of claim 7, wherein the two or more corresponding guide pins on each first die are configured to engage the corresponding first die to a mechanically transferable push-on (MTP) connector.

16. The wafer assembly of claim 7, wherein the corresponding lens unit in each second die of the lens wafer includes one of a lens or a lens array.

17. The wafer assembly of claim 7, wherein the corresponding first die from the guide pin wafer, the corresponding second die from the circuit wafer, and the corresponding third die from the lens wafer are aligned with each other on the wafer scale level to form an optical die assembly, and the optical die assembly is configured to perform at least one of a transmission function or a receiving function.

18. The wafer assembly of claim 7, wherein:
the circuit wafer is made of glass;
the circuit wafer is configured as a carrier substrate for circuit units mounted on the circuit wafer; and
the circuit wafer is transparent to allow lights from the circuit units to propagate through the circuit wafer to corresponding lens units of the lens wafer.

19. A method to form a plurality of optical die assemblies, the method comprising:
forming a guide pin wafer that includes:
a base wafer that includes multiple first dies, each first die including a corresponding lens cutout; and
multiple guide pins mounted on a first surface of the base wafer, each first die of the base wafer being mounted with two or more corresponding guide pins from the multiple guide pins;
forming a circuit wafer that includes multiple second dies, each second die including a corresponding circuit unit;
forming a lens wafer that includes multiple third dies, each third die including a corresponding lens unit;
aligning the guide pin wafer, the circuit wafer, and the lens wafer together such that each third die of the lens wafer is positioned between a corresponding first die of the guide pin wafer and a corresponding second die of the circuit wafer;
stacking the aligned guide wafer, the circuit wafer, and the lens wafer together to form a wafer assembly; and
separating the plurality of optical die assemblies from the wafer assembly, each of the plurality of optical die assemblies including a third die of the lens wafer sandwiched between a first die of the guide pin wafer and a second die of the circuit wafer.

20. The method of claim 19, wherein separating the plurality of optical die assemblies from the wafer assembly includes dicing the wafer assembly into the plurality of optical die assemblies.

21. The method of claim 19, wherein forming the guide pin wafer includes implanting the guide pins in the base wafer before the wafer assembly is diced into the plurality of optical die assemblies.

* * * * *